US009423958B2

(12) United States Patent  (10) Patent No.: US 9,423,958 B2
Ho  (45) Date of Patent: Aug. 23, 2016

(54) SYSTEM AND METHOD FOR MANAGING EXPANSION READ-ONLY MEMORY AND MANAGEMENT HOST THEREOF

(71) Applicant: VIA Technologies, Inc., New Taipei (TW)

(72) Inventor: Kuan-Jui Ho, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 115 days.

(21) Appl. No.: 14/463,679

(22) Filed: Aug. 20, 2014

(65) Prior Publication Data

US 2015/0317089 A1  Nov. 5, 2015

(30) Foreign Application Priority Data

May 2, 2014  (TW) .............................. 103115818 A

(51) Int. Cl.
| | |
|---|---|
| *G06F 3/06* | (2006.01) |
| *G06F 13/40* | (2006.01) |
| *G06F 12/02* | (2006.01) |
| *G06F 12/06* | (2006.01) |
| *G06F 9/455* | (2006.01) |

(52) U.S. Cl.
CPC ............... *G06F 3/06* (2013.01); *G06F 3/0613* (2013.01); *G06F 3/0659* (2013.01); *G06F 3/0679* (2013.01); *G06F 9/455* (2013.01); *G06F 12/02* (2013.01); *G06F 12/0638* (2013.01); *G06F 13/4022* (2013.01); *G06F 12/0623* (2013.01); *G06F 2206/1014* (2013.01)

(58) Field of Classification Search
CPC ... G06F 3/0613; G06F 3/0659; G06F 3/0679; G06F 12/0623; G06F 12/0638; G06F 13/4022; G06F 2206/1014
See application file for complete search history.

(56) References Cited

U.S. PATENT DOCUMENTS

| | | | | |
|---|---|---|---|---|
| 2008/0276011 | A1* | 11/2008 | Bircher | G06F 12/023 710/8 |
| 2009/0187699 | A1* | 7/2009 | Cho | G06F 12/0246 711/102 |
| 2012/0102491 | A1* | 4/2012 | Maharana | G06F 9/45558 718/1 |
| 2013/0159686 | A1* | 6/2013 | Graham | G06F 9/5077 713/1 |
| 2015/0169331 | A1* | 6/2015 | Nelogal | G06F 13/4022 710/108 |

* cited by examiner

*Primary Examiner* — Yong Choe
*Assistant Examiner* — Glenn Gossage
(74) *Attorney, Agent, or Firm* — Jianq Chyun IP Office

(57) ABSTRACT

A system and a method for managing an expansion read-only memory (ROM), and a management host thereof are provided. The management host is connected with a computer host through a bridge. The management host establishes an address lookup table to assign a virtual function and an expansion ROM corresponding to the virtual function. When a request is issued by the computer host to obtain a size of the expansion ROM, the management host provides data in a shadow register block corresponding to the expansion ROM to the computer host according to the address lookup table. The computer host assigns a memory block in the computer host to the expansion ROM according to the data in the shadow register block. When a request is issued by the computer host to obtain data of the expansion ROM through the bridge, the management host provides the data of the expansion ROM to the computer host according to the memory block.

27 Claims, 6 Drawing Sheets

SYSTEM AND METHOD FOR MANAGING EXPANSION READ-ONLY MEMORY AND MANAGEMENT HOST THEREOF

CROSS-REFERENCE TO RELATED APPLICATION

This application claims the priority benefit of Taiwan application serial no. 103115818, filed on May 2, 2014. The entirety of the above-mentioned patent application is hereby incorporated by reference herein and made a part of this specification.

BACKGROUND OF THE INVENTION

1. Field of the Invention

The invention relates to a virtualization technique of a computer system, and more particularly, relates to a system and a method for managing an expansion read-only memory (expansion ROM) that supports a virtual function (VF) and a management host thereof.

2. Description of Related Art

In recent years, due to the rapid progress in the development of the Internet, users have higher demands for information services, which imposes a heavier burden on a server. Therefore, in order to reduce costs and efficiently use resources, server virtualization technology has gradually become the trend. In terms of the specification of PCIE (peripheral component interconnect express), single root I/O virtualization (SR-IOV) is one effective solution for server virtualization. The SR-IOV technology allows a physical host (e.g. computer host) to assign virtual functions (VF) to different virtual machines.

On the other hand, because an operating system can be stored in a variety of storage media (e.g. hard disc, network server, compact disk-read only memory (CD-ROM), etc.), the physical host provides various boot options for the user to load the system. For example, an expansion read-only memory base address register (expansion ROM BAR) in a physical function (PF) of a device that supports the SR-IOV technology, e.g. network adapter, is provided with a memory mapped input output (MMIO) address for accessing the content of an expansion ROM, and this contact supports a program or kernel of a preboot execution environment (PXE). The physical host needs to obtain the program content of the PXE, so as to acquire the operating system required for booting through the network. However, the expansion ROM BAR in the virtual function of the device that supports the SR-IOV technology is reserved. For this reason, PXE boot is not available.

SUMMARY OF THE INVENTION

The invention provides a system and a method for managing an expansion read-only memory (expansion ROM) and a management host thereof, which support a virtual function for applying the expansion ROM.

The invention provides an expansion ROM management system that includes a computer host and a management host. The management host is connected with the corresponding computer host respectively through a bridge. The management host has a virtual function (VF) and establishes an address lookup table to assign the virtual function and the expansion ROM corresponding to the virtual function to the computer host. Moreover, when the computer host issues a request to obtain a size of the expansion ROM of the virtual function, the management host provides data in a shadow register block corresponding to the expansion ROM to the computer host according to the address lookup table, and the computer host assigns a memory block in the computer host to the expansion ROM according to the data in the shadow register block. When the computer host issues a request to obtain the data of the expansion ROM through the bridge, the management host provides the data of the expansion ROM to the computer host according to the memory block.

From another aspect, the invention provides an expansion ROM management method that includes the following. An address lookup table is established for assigning a virtual function and an expansion ROM corresponding to the virtual function to a computer host. When the computer host issues a request to obtain a size of the expansion ROM of the virtual function, data in a shadow register block corresponding to the expansion ROM is provided to the computer host according to the address lookup table. In addition, the computer host assigns a memory block of the computer host to the expansion ROM according to the data in the shadow register block. When the computer host issues a request to obtain the data of the expansion ROM through a bridge, the data of the expansion ROM is provided to the computer host according to the memory block.

From another aspect, the invention provides a management host that includes a switch, an input/output (I/O) virtualization device, and a management processor. The switch includes a bridge that is respectively coupled to a corresponding computer host. The I/O virtualization device is coupled to the switch and has a virtual function. The management processor is coupled to the switch. The management processor establishes an address lookup table to assign the virtual function and an expansion ROM corresponding to the virtual function to the computer host. When the computer host issues a request to obtain a size of the expansion ROM of the virtual function, the management processor provides data in a shadow register block corresponding to the expansion ROM to the computer host according to the address lookup table, and the computer host assigns a memory block to the expansion ROM according to the data in the shadow register block, wherein when the computer host issues a request to obtain the data of the expansion ROM through the bridge, the management processor provides the data of the expansion ROM to the computer host according to the memory block.

Based on the above, the expansion ROM management system described in the embodiments of the invention assigns the virtual function and the expansion ROM to the computer host in advance for establishing the address lookup table. When the computer host intends to obtain the size of the expansion ROM, the management host performs an operation on the write command transmitted by the computer host, so as to provide the data in the shadow register block corresponding to the expansion ROM to the computer host, such that the computer host can read the data of the expansion ROM through the bridge. Thus, with use of the expansion ROM management system of the embodiments of the invention, the virtual function of the expansion ROM management system supports provision of the data of the expansion ROM.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In order to enable a virtual function of a SR-IOV device to support an expansion ROM, so as to obtain an operating system required for booting through a network, embodiments of the invention provide a system and a method for assigning virtual functions and a management host thereof. When a computer host intends to obtain a size of the expansion ROM in the management host, the management host transfers a write command transmitted by the computer host to a shadow register block, and then through an operation, the computer host receives the size of data in the shadow register block provided by the management host. Here, the management host performs as a proxy by using software simulation, and the shadow register block is capable of storing data related to the proxy, e.g. data of a virtual expansion ROM BAR, data of a memory enable bit, etc. After confirming the size, the computer host assigns a memory address to the expansion ROM to obtain data of the expansion ROM. In addition, according to the embodiments of the invention, the management host further obtains data of the expansion ROM in a memory by software simulation. Accordingly, with the invention, the virtual function can support the expansion ROM, so that the management host can use the resources in the SR-IOV device more flexibly.

Figure 1:
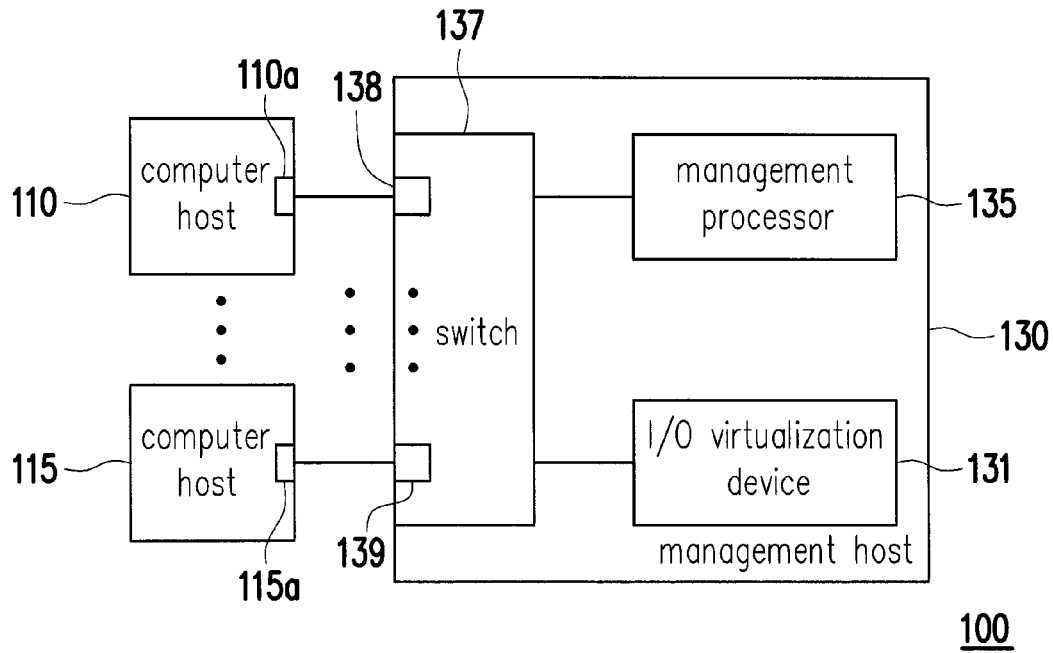
FIG. 1 is a block diagram illustrating an expansion ROM management system according to an embodiment of the invention.

FIG. 1 is a block diagram illustrating an expansion ROM management system according to an embodiment of the invention. With reference to FIG. 1, an expansion ROM management system 100 includes a computer host 110, a computer host 115, and a management host 130.

The computer host 110 or 115 may be an electronic device, such as a desktop computer or a laptop computer that includes a central processing unit (CPU) or other programmable microprocessors for general use or special use, a digital signal processor (DSP), a programmable controller, or an application specific integrated circuit (ASIC). It is noted that, in this embodiment, the computer hosts 110 and 115 further include a chip, such as a south bridge chipset, a north bridge chipset, etc., which is capable of processing signal transmission of each component/equipment in the computer hosts 110 and 115.

In this embodiment, the computer hosts 110 and 115 and the management host 130 support the peripheral component interconnection express (PCIe) specification. Electrical connection, communication, detection, and access between the computer hosts 110 and 115 and the management host 130 may be carried out by means of a cable used with a PCIe connector, or by plugging the PCIe connector of the computer hosts 110 and 115 in a PCIe slot of the management host 130. Nevertheless, the disclosure here is not intended to limit a method of coupling the computer hosts 110 and 115 and the management host 130. Different coupling methods may be adopted depending on a transmission interface used in this embodiment.

In this embodiment, the management host 130 includes an I/O virtualization device 131, a management processor 135, and a switch 137. The I/O virtualization device 131 may be equipment such as a network adapter that supports the SR-IOV technology. Generally speaking, the I/O virtualization device 131 that supports the SR-IOV technology may have one or a plurality of PCIe physical functions (PF), and each of the physical functions may correspond to at least one virtual function (VF), wherein the virtual function may be provided for use of a virtual machine, and one physical function corresponds to 64 virtual functions, for example.

Generally, when the user turns on a computer (e.g. desktop computer or laptop computer), a basic input/output system (BIOS) transmits a power on self-test (POST) sequence to scan each component connected with a motherboard and searches for the expansion ROM for loading the operating system. More specifically, the BIOS first confirms validity of a content of the expansion ROM BAR based on the size of the expansion ROM provided by a carrier (e.g. network adapter) of the expansion ROM. If the content is valid, a memory-mapping input and output (MMIO) address is disposed for accessing the content of the expansion ROM, wherein this content is a program that supports preboot execution environment (PXE). Then, a physical host needs to obtain a program content of the PXE, so as to acquire the operating system required for booting through the network. However, under normal circumstances, only the content of the expansion ROM BAR of the physical function can be confirmed. Because a bit content of the expansion ROM BAR of the virtual function is 0 and is read only, it cannot be confirmed, and thus data of the expansion ROM corresponding to the virtual function cannot be obtained.

In addition, although the SR-IOV technology allows multiple virtual machines to use the virtual functions of the I/O virtualization device, only one computer host (e.g. one of the computer hosts 110 and 115) can be supported. In order to overcome the limitation of the SR-IOV technology, the management host 130 may utilize a non-transparent bridge (NTB) and assign the virtual functions of the I/O virtualization device 131 to the computer hosts 110 and 115, such that the I/O virtualization device 131 can be used by the computer hosts 110 and 115 simultaneously. The non-transparent bridge overcomes the limitation of use of only one computer host. However, the computer host still cannot read the data of the expansion ROM corresponding to the virtual function. That is, the management host is only capable of providing data of the expansion ROM corresponding to the physical function. Therefore, when the computer host intends to obtain the size of the expansion ROM corresponding to the virtual function, the invention provides data in the shadow register block by software simulation, such that the computer host can obtain valid BAR content. Accordingly, the computer host can read data of the expansion ROM corresponding to the virtual function.

Referring to FIG. 1 again, the management processor 135 may be a central processing unit (CPU), a programmable microprocessor for general use or special use, a digital signal processor (DSP), a programmable controller, an application specific integrated circuit (ASIC), other similar components, or a combination of the foregoing. In this embodiment, the management processor 135 is configured to process all operations of the management host 130 in this embodiment. In addition, the management processor 135 may obtain available virtual functions in the management host 130 and the number of the available virtual functions. The management processor 135 may also obtain available computer hosts and the number of the available computer hosts. In this embodiment, two computer hosts 110 and 115 are illustrated as an example; however, the invention is not limited in the number of the available computer hosts. The management processor 135 may establish a lookup table according to the capability of the computer hosts 110 and 115 and the virtual functions (e.g. computing speed, memory size, etc.) or a virtual machine establishing request transmitted by upper level software, so as to assign the virtual functions to the computer hosts 110 and 115 according to the lookup table. The lookup table includes a PCI configuration space address (e.g. a Bus/Device/Function (B/D/F) address) of each virtual function, to which the computer hosts 110 and 115 correspond.

The switch 137 may be a PCIe switch or other types of switches that support the PCIe specification. The switch 137 includes bridges 138 and 139. From the aspect of the computer hosts 110 and 115, the bridges 138 and 139 may be deemed as PCI-to-PCI (P2P) bridges; and from the aspect of the management processor 135, the bridges 138 and 139 may be deemed as non-transparent bridges (NTB). Two ends of the bridges 138 and 139 are respectively connected with the computer host 291, the bridge 290 may be deemed as a P2P bridge; and from the aspect of the management processor 210, the bridge 290 may be deemed as a non-transparent bridge (NTB). In this embodiment, the management processor 210 may be deemed as an embodiment of the management processor 135 of FIG. 1. In this embodiment, the PCIe switch 250 may be deemed as an embodiment of the switch 137 of FIG. 1. The single root I/O virtualization device 270 may be deemed as an embodiment of the I/O virtualization device 131 of FIG. 1. The bridge 290 may be deemed as an embodiment of the bridges 138 and 139 of FIG. 1. The computer host 291 may be deemed as an embodiment of the computer hosts 110 and 115 of FIG. 1. Moreover, the root complex device 220 may be deemed as a part of the management processor 135 or a part of the switch 137 of FIG. 1.

To facilitate the illustration, the computer host 110 of FIG. 1 is described as an example in the following embodiment. However, it is noted that the invention is not limited thereto, and the computer host 115 may also be used in other embodiments. The management processor 135 of the management host 130 establishes an address lookup table to assign the virtual function and the expansion ROM corresponding to the virtual function to the computer host 110. For instance, Table 1 is an example of the address lookup table, wherein the address lookup table 1 includes: validity status (Valid), computer host number (CH), virtual function address of computer host end (CH-B/D/F), virtual function address of management host end (M-B/D/F), filter status (filter enable), filter range (filter range), shadow register block, memory address of computer host end (CH memory), memory address of management host end (M memory), memory size (size), and memory address translation enable status (memory address remap enable).

TABLE 1

| validity status (Valid) | computer host number (CH) | virtual function address of computer host end (CH-B/D/F) | virtual function address of management host end (M-B/D/F) | filter status (filter enable) | filter range | shadow register block |
|---|---|---|---|---|---|---|
| 1 | 1 | 2/0/0 | 4/3/2 | 0 | 30-33 | 0 |

| memory address of computer host end (CH memory) | memory address of management host end (M memory) | memory size (size) | memory address translation enable status |
|---|---|---|---|
| 0 | Mem_m | 1M Bytes | 0 | computer hosts 110 and 115 and the management host 130, and therefore each has a PCI domain and a memory domain. Thus, it is required to perform an address translation for the two PCI domains and memory domains according to the lookup table, wherein an address translation lookup table will be explained below. Moreover, the bridges 138 and 139 are respectively coupled to root ports 110a and 115a of the corresponding computer hosts 110 and 115. The bridges 138 and 139 may be physical bridges having the Bus/Device/Function (B/D/F) addresses.

Figure 2:
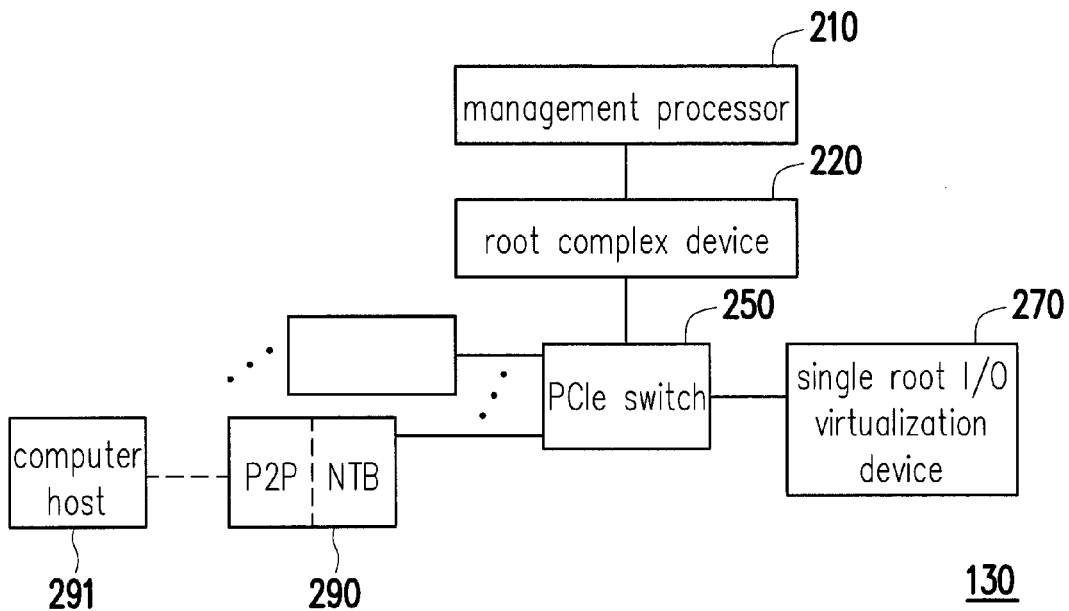
FIG. 2 illustrates an example of a management host of FIG. 1 according to an embodiment of the invention.

FIG. 2 illustrates an example of the management host 130 of FIG. 1 according to an embodiment of the invention. In this embodiment, a management processor 210 in the management host 130 controls a PCIe switch 250 through a root complex device 220. The PCIe switch 250 is connected with a single root I/O virtualization device 270 and a plurality of bridges 290, wherein the bridges 290 may be connected with a corresponding computer host 291. From the aspect of the The management processor 135 determines whether to perform as a proxy by software simulation according to the validity status. For example, if the value of the validity status of Table 1 is 0 which indicates "disable", the management host 130 does not perform as a proxy, and the shadow register block does not store any data. If the value of the validity status of Table 1 is 1 which indicates "enable", the management host 130 performs as a proxy, and data related to the proxy is stored in the shadow register block. In the address lookup table, the number of the computer host 110 is 1, the virtual function CH-B/D/F address of the computer host end is 2/0/0, and the virtual function M-B/D/F address of the management host end is 4/3/2, for example. The B/D/F address refers to a Bus/Device/Function address. If the value of the filter status (filter enable) is 0, for example, it indicates "disable", and the value 1 indicates "enable", for example. The filter range indicates a register address of the expansion ROM (e.g. address Offset 30-33 in the shadow register block). The data in the shadow register block is for example 0, which indicates that no data is stored, and the shadow register block may also store data related to the proxy of the management host 130 (e.g. data of the virtual expansion ROM BAR corresponding to the virtual function stored at the Offset 30-33 address or memory enable bit stored at the Offset 04 address). Generally, the related data is written in the shadow register block according to a corresponding write configuration command. In an embodiment of the invention, the shadow register block is a memory block (e.g., a memory block in the memory (not shown) of the management host 130). If the value of the memory address of the computer host end is 0, for example, it indicates that the computer host 110 does not assign an address to the expansion ROM yet. If the memory address of the management host end is Mem_m, it indicates that the management host 130 assigns an address Mem_m to the expansion ROM. The memory size refers to the size of the expansion ROM (e.g. 1M Bytes). If the value of the memory address translation enable status is 0, for example, it indicates that the management host 130 does not perform the memory address translation; and if the value of the memory address translation enable status is 1, for example, it indicates that the management host 130 performs the memory address translation.

Under the setting of the above parameters, when the management host 130 receives a configuration command (e.g. read or write command) from the computer host 110, the management host 130 translates the virtual function CH-B/D/F address of the computer host end (e.g. 2/0/0) to the virtual function M-B/D/F address of the management host end (e.g. 4/3/2). Moreover, the shadow register block stores write data related to the configuration command. It should be noted that the parameters/values provided in Table 1 are merely examples and may be adjusted by those skilled in the art according to their needs in other embodiments.

TABLE 2

| validity status (Valid) | computer host number (CH) | virtual function address of computer host end (CH-B/D/F) | virtual function address of management host end (M-B/D/F) | filter status (filter enable) | filter range | shadow register block |
|---|---|---|---|---|---|---|
| 1 | 1 | 2/0/0 | 4/3/2 | 1 | 30-33 | 0 |

| memory address of computer host end (CH memory) | memory address of management host end (M memory) | memory size (size) | memory address translation enable status |
|---|---|---|---|
| 0 | Mem_m | 1M Bytes | 0 |

Table 2 is another embodiment of the address lookup table. In the setting of the above parameters, if the value of the filter status (filter enable) is 1, for example, it indicates "enable". In that case, when the management host 130 receives a read configuration command from the computer host 110, the command is filtered according to the filter range (e.g. Offset 30-33 address). If the filter range matches (hits) the command, the management processor 135 translates the virtual function CH-B/D/F address (e.g. 2/0/0) of the computer host end to the shadow register block for reading the related data and does not perform reading at the virtual function M-B/D/F address of the management host end (e.g. 4/3/2). Likewise, if the configuration command received by the management host 130 is a write configuration command, the management processor 135 filters the command according to the filter range (e.g. Offset 30-33 address). If the filter range matches (hits) the command, the management processor 135 transfers the virtual function CH-B/D/F address of the computer host end (e.g. 2/0/0) to the related area of the shadow register block and does not perform writing at the virtual function M-B/D/F address of the management host end (e.g. 4/3/2). On the contrary, if the filter range does not match the command, the management host 130 processes the command in a way that the filter status (filter enable) is "disable".

Figure 3:
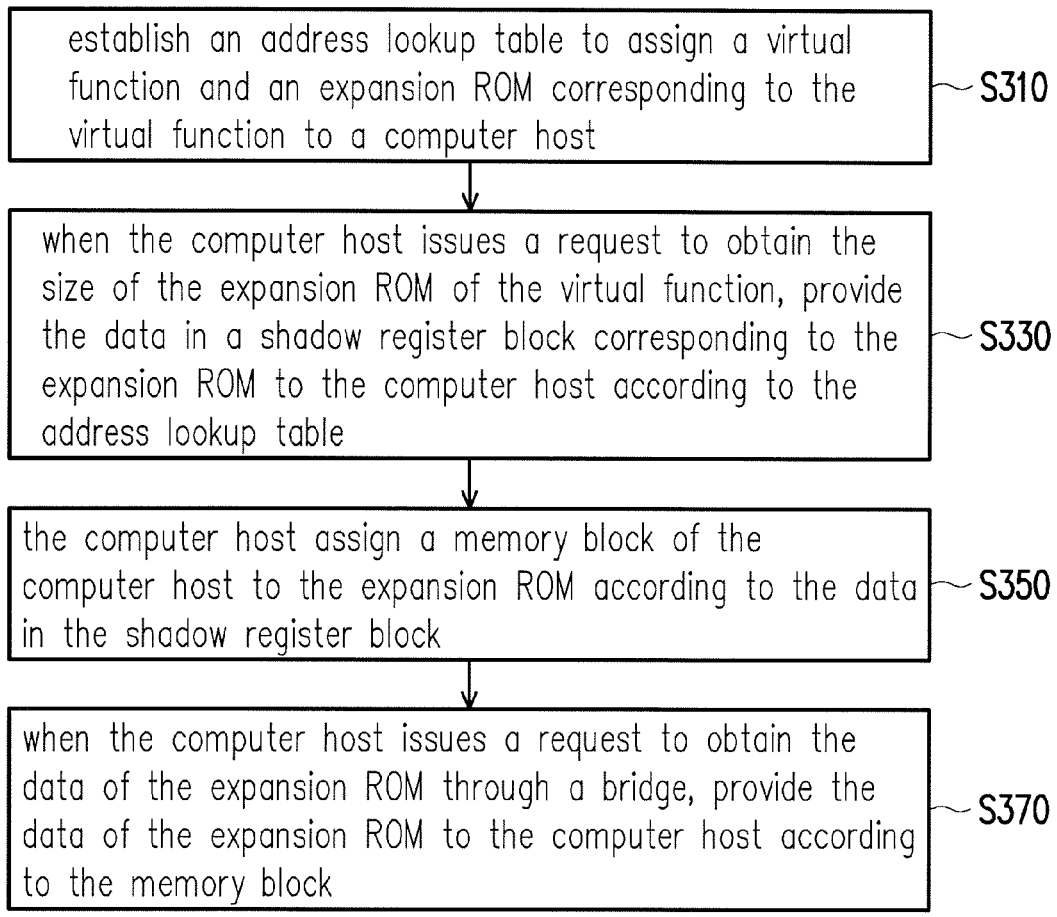
FIG. 3 is a flowchart illustrating an expansion ROM management method according to an embodiment of the invention.

FIG. 3 is a flowchart illustrating an expansion ROM management method according to an embodiment of the invention. Referring to FIG. 3, a determining method of this embodiment is adapted for the expansion ROM management system 100 of FIG. 1. In the following paragraphs, reference will be made to the modules and components of the expansion ROM management system 100 for describing the management method of this embodiment. Steps of the management method may be adjusted according to the situation of implementation, and the invention is not limited thereto. In Step S310, the management processor 135 of the management host 130 establishes an address lookup table to assign a virtual function and an expansion ROM corresponding to the virtual function to the computer host 110. The address lookup table established here is Table 2 described above, for example.

It should be noted that, when the user turns on the computer host 110, the BIOS executes a boot process (e.g. transmitting the POST sequence) and starts executing an enumeration process, and the computer host 110 inquires about a connection configuration of a PCIe device (e.g. virtual function, virtual bridge, etc.) in the management host 130. When the computer host 110 scans the bridge 138, the management processor 135 transmits data of the virtual function through the bridge 138 according to the address lookup table (e.g. Table 2). More specifically, if the computer host 110 issues a configuration command (e.g. read command) including the virtual function address of the computer host end (e.g. 2/0/0) at this moment, software (e.g. operating system, application program, firmware, control program, etc.) in the management host 130 compares the command with the data in the address lookup table to confirm whether there is a match (Hit). In Table 2, the B/D/F address of the computer host end (e.g. 2/0/0) corresponds to the B/D/F address of the management host end (e.g. 4/3/2) in the address lookup table, and the management host 130 translates the B/D/F address of the computer host end (e.g. 2/0/0) to the B/D/F address of the management host end (e.g. 4/3/2). At that time, the software proxy application of the management host 130 generates the configuration command including the B/D/F address (e.g. 4/3/2) for obtaining data related to the virtual function at the corresponding address. Next, the management processor 135 writes the data related to the virtual function to the bridge 138 and notifies the computer host 110 that this configuration command is completed.

When the computer host 110 is notified that the configuration command is completed, the computer host 110 discovers the virtual functions disposed by the management host 130. In Step S330, when the computer host 110 issues a request to obtain the size of the expansion ROM of the virtual function, an operation result (data) in the shadow register block corresponding to the expansion ROM is provided to the computer host 110 according to the address lookup table. The filter status in the address lookup table (e.g. Table 1) is preset as "disable." When the computer host 110 transmits a write command to the management host 130, the management processor 135 sets the filter status in the address lookup table (e.g. Table 1) to "enable" according to the write command. To be more specific, Table 3 is another example of the address lookup table.

TABLE 3

| validity status (Valid) | computer host number (CH) | virtual function address of computer host end (CH-B/D/F) | virtual function address of management host end (M-B/D/F) | filter status (filter enable) | filter range | shadow register block |
|---|---|---|---|---|---|---|
| 1 | 1 | 2/0/0 | 4/3/2 | 1 | 30-33 | data |

| memory address of computer host end (CH memory) | memory address of management host end (M memory) | memory size (size) | memory address translation enable status |
|---|---|---|---|
| 0 | Mem_m | 1M Bytes | 0 |

Referring to Table 3, the computer host 110 transmits the write command to obtain the size of the ROM. When the management host 130 receives the write command transmitted by the computer host 110, the command is filtered according to the filter range (e.g. Offset 30-33 address) because the value of the filter status (filter enable) in the address lookup table is 1, which indicates "enable". If the filter range matches (hits) the command, the management host 130 transfers the write command to the corresponding shadow register block in the address lookup table by using software simulation (e.g. operating system, application program, firmware, control program, etc.). The management host 130 performs an operation (e.g. performing an operation using the write command and the below-described mask bit) on the data in the corresponding shadow register block (i.e. data in the shadow register block in the address lookup table) and provides the data in the corresponding shadow register block to the computer host 110 according to the operation result. It should be noted that, in this embodiment, all bits in the write command are 1. In this step, the management processor 135 does not transmit the write command from the computer host 110 to the virtual function M-B/D/F address of the management host end (e.g. 4/3/2) for writing.

Figure 4A:
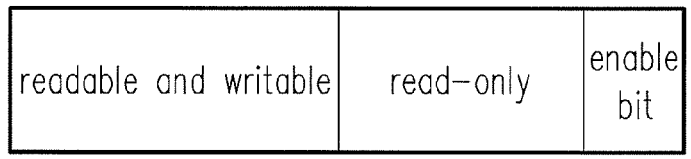
FIG. 4A and FIG. 4B illustrate examples of an expansion read-only memory base address register (expansion ROM BAR) and an operational mask bit according to an embodiment of the invention.
Figure 4B:
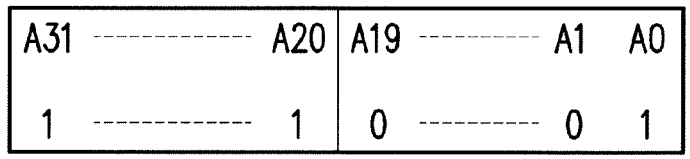

FIG. 4A and FIG. 4B illustrate examples of an expansion read-only memory base address register (expansion ROM BAR) and an operational mask bit according to an embodiment of the invention. With reference to FIG. 4A first, FIG. 4A is an example of the expansion ROM BAR of a physical function. In FIG. 4A, from bit 19 to bit 1 (bit [19:1]) are read-only, and from bit 31 to bit 20 (bit [31:20]) and bit 0 (bit [0]) are readable and writable. Also, the bit 0 (bit [0]) is an expansion ROM BAR enable bit, wherein the value 0 indicates "disable" and the value 1 indicates "enable", for example. For a general device or the physical function of the device that supports SR-IOV technology, the management processor 135 transmits the write command and read command to this device, and transmits the result back to the computer host 110. That is, the management processor 135 performs writing at the corresponding virtual function M-B/D/F address of the management host end (e.g. 4/3/2) and transmits the operation result back to the computer host 110, and is not required to store the write command in the shadow register block. However, in the standard of the SR-IOV technology, all the bits in the expansion ROM BAR of the virtual function are limited to being read-only, and the value is 0. Therefore, the computer host 110 determines the size of the expansion ROM of the virtual function as invalid and cannot proceed with the operation of reading the data of the expansion ROM of the virtual function. In order to overcome the above limitation, in the present invention, a mask bit is first generated according to the size of the expansion ROM of the virtual function (e.g. 1M Bytes). The management processor 135 performs an AND operation on the data in the shadow register block (e.g. all are write commands of 1) and the mask bits, and the management processor 135 transmits the operation result as the data in the shadow register block to the computer host 110 through the switch 137. Here, the operation result may be deemed as a virtual address register of the virtual function in the shadow register block (e.g. virtual expansion ROM BAR).

With reference to FIG. 4B, it is noted that FIG. 4B illustrates an example of the mask bits according to an embodiment of the invention. The management processor 135 generates the mask bits according to the size of the expansion ROM. More specifically, a method of generating the mask bits according to the invention includes: first obtaining the size of the expansion ROM (e.g. 1M Bytes), presenting the size of the expansion ROM in a binary form (e.g. 1M is approximately 2^20 and is converted to 10000000000000000000b in the binary Rum), filling the size of the expansion ROM in the binary form into the mask bits and setting all values of the most significant bits (MSBs) of the size of the expansion ROM in the binary form in the mask bits (e.g. bit [31:20]) to 1, setting the bit 0 (bit [0]) that serves as the enable bit to 1 to indicate "enable," and setting the rest of the bits to 0 (bit [19:1]), so as to complete the mask bits.

It should be noted that, when the filter status (filter enable) in the address lookup table is "disable" (e.g. in Table 1, the value of the filter status is 0), the management processor 135 does not filter the expansion ROM BAR. That is, when the computer host 110 issues the request to the management host 130 to obtain the size of the expansion ROM, the management host 130 reads the corresponding register content through the virtual function by a general method and transmits the same to the computer host 110. On the contrary, when the filter status (filter enable) in the address lookup table is "enable" (e.g. in Table 2 or 3, the value of the filter status is 1), the management processor 135 filters the expansion ROM BAR (i.e. in Step S330, the management processor 135 transfers the write command to the shadow register block and performs an operation on the write command and the mask bits), so as to provide the operation result stored in the shadow register block to the computer host 110. It is worth noticing that, for the limited virtual function of the device that supports the SR-IOV technology, the operation result is used in the present invention in place of the original expansion ROM BAR to provide the virtual expansion ROM BAR, so as to overcome the limitation that all bits in the expansion ROM BAR are read-only and the value is 0. In other words, the operation result may be deemed as the virtual expansion ROM BAR.

In Step S350 (FIG. 3), the computer host 110 assigns a memory block of the computer host 110 to the expansion ROM according to the data in the shadow register block, as shown in Table 4.

Therefore, when the size of the expansion ROM is valid, the computer host 110 assigns the memory block to the expansion ROM in the memory (not shown) of the computer host 110 according to the size of the expansion ROM. For example, the computer host 110 assigns addresses of 3G to 3G+1M-1 in the memory thereof to the expansion ROM and writes the assignment result to the virtual expansion ROM BAR. The management host 130 receives the write command and then updates it to the memory address of the computer host end of Table 4.

It should be noted that, for example, in order to perform the memory-mapping input and output (MMIO) procedure, generally the computer host 110 assigns a portion of the memory blocks (e.g. memory addresses of 0x11000000 to 0x11001000-1) in the memory (not shown) to the peripheral component (e.g. network card, graphics card, etc.), so as to map a memory or register of the peripheral component to this memory block, for the computer host 110 to perform an I/O process.

Generally speaking, the memory enable bit in the shadow register block (e.g. address Offset 04 in the shadow register block) and a preset value of the enable bit of the virtual expansion ROM BAR are 0, which indicates "disable". When the computer host 110 obtains the size of the expansion ROM and further assigns the memory address of the computer host end (e.g. 3G, etc.) to the expansion ROM, the computer host 110 sets the virtual expansion ROM BAR to 3G, sets the enable bit of the expansion ROM BAR to "enable", and sets the memory enable bit of the virtual function to "enable". On the other hand, the memory address

TABLE 4

| validity status (Valid) | computer host number (CH) | virtual function address of computer host end (CH-B/D/F) | virtual function address of management host end (M-B/D/F) | filter status (filter enable) | filter range | shadow register block |
|---|---|---|---|---|---|---|
| 1 | 1 | 2/0/0 | 4/3/2 | 1 | 30-33 | data |

| memory address of computer host end (CH memory) | memory address of management host end (M memory) | memory size (size) | memory address translation enable status |
|---|---|---|---|
| 3G | Mem_m | 1M Bytes | 0 |

More specifically, when the computer host 110 determines that the read data of the virtual expansion ROM BAR is valid, the computer host 110 calculates the size of the expansion ROM (e.g. 1M Bytes, 2M Bytes, etc.) according to the data of the virtual expansion ROM BAR. It is noted that, if all the bits in the data that indicates the size of the expansion ROM, as obtained by the computer host 110, are 0, the computer host 110 determines that this expansion ROM is invalid. In particular, if the bits in the data of the size of the expansion ROM are not all 0, the computer host 110 determines that this expansion ROM is valid. The data of the size of the expansion ROM refers to the size calculated from the data of the virtual expansion ROM BAR. In addition, for the virtual function, if the operation result is not provided to the computer host 110 through the shadow register block, all the bits in the data of the size of the expansion ROM corresponding to the virtual function are 0, and the computer host 110 determines that this expansion ROM is invalid.

translation enable status is preset to "disable", and when the filter status and the enable bit in the data in the shadow register block (e.g. the bit 0 in the data of virtual expansion ROM BAR in the shadow register block) and the memory enable bit in the shadow register block are "enable", then management processor 135 sets the memory address translation enable status to "enable". In other words, only when the management host 130 simultaneously satisfies the following conditions: the filter status is "enable" (e.g. the value is 1), the enable bit of the virtual expansion ROM BAR is "enable" (e.g. the value is 1), and the memory enable bit in the shadow register block is "enable" (e.g. the value is 1), the management host 130 performs the memory address translation of the computer host end and the management host end, and at the same time the management processor 135 changes the memory address translation enable status from the original "disable" (e.g. the value is 0) to "enable" (e.g. the value is 1), which is as shown in Table 5.

TABLE 5

| validity status (Valid) | computer host number (CH) | virtual function address of computer host end (CH-B/D/F) | virtual function address of management host end (M-B/D/F) | filter status (filter enable) | filter range | shadow register block |
|---|---|---|---|---|---|---|
| 1 | 1 | 2/0/0 | 4/3/2 | 1 | 30-33 | data |

| memory address of computer host end (CH memory) | memory address of management host end (M memory) | memory size (size) | memory address translation enable status |
|---|---|---|---|
| 3G | Mem_m | 1M Bytes | 1 |

In Step S370, when the computer host 110 issues a request to obtain data of the expansion ROM through the bridge 138, the data of the expansion ROM is provided to the computer host 110 according to the memory block. To be more specific, because the computer host 110 already assigns the memory block (e.g. memory address 3G) to the expansion ROM, the computer host 110 can execute the MMIO procedure (e.g. transmit a MMIO read command (read cycle)) to read the data of the expansion ROM. When the computer host 110 transmits the read command, the management host 130 provides the data of the expansion ROM according to the address lookup table, wherein the management host 130 checks whether the memory address translation enable status is "enable". On the other hand, if the computer host 110 transmits a write command to the expansion ROM, the management host 130 ignores this write command. Four embodiments are given below to explain how the invention enables the computer hosts 110 and 115 to read the data of the expansion ROM. In these embodiments, only one computer host (e.g. computer host 110 or 115) is connected as an example. However, it is noted that these embodiments are provided for illustrative purposes, and those skilled in the art may combine and apply the disclosure of these embodiments as appropriate. Thus, the following embodiments should not be construed as a limitation to the invention.

Figure 5:
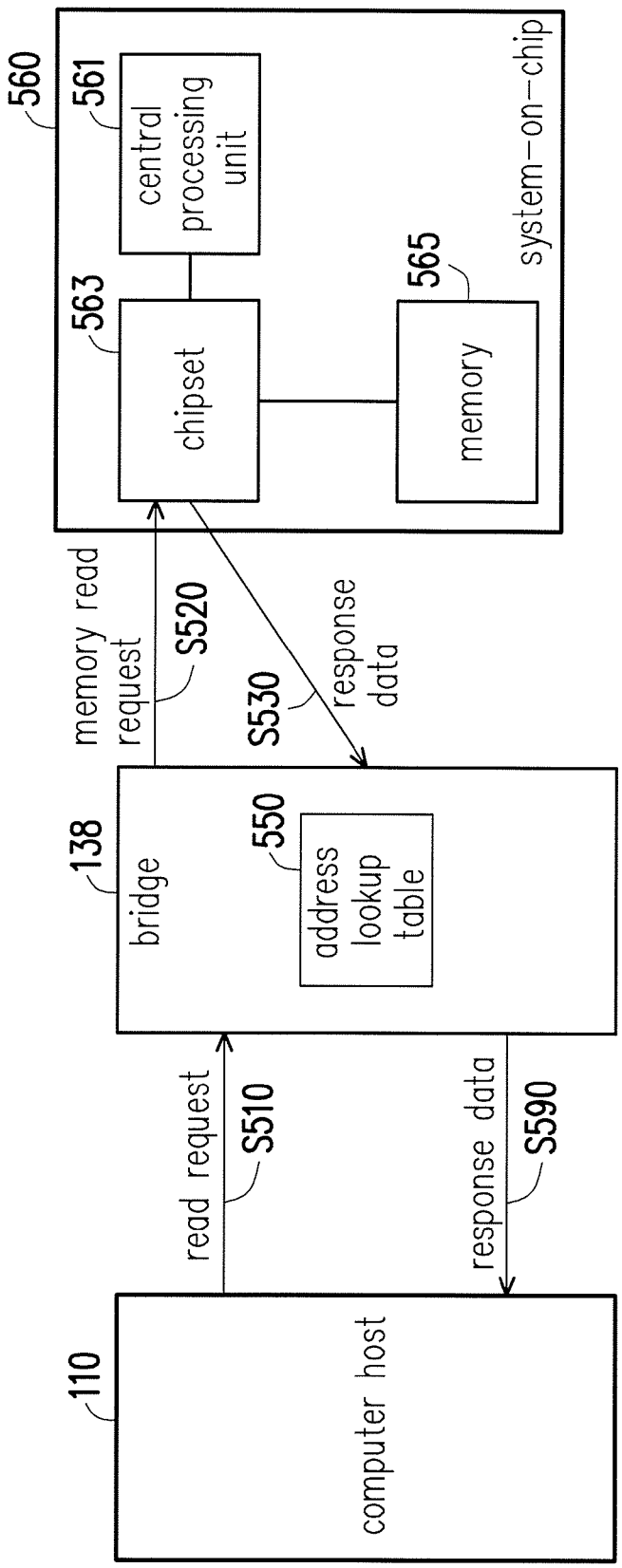
FIG. 5 is a flowchart illustrating a computer host reading data of an expansion ROM according to an embodiment of the invention.

FIG. 5 is a flowchart illustrating the computer host 110 reading the data of the expansion ROM according to an embodiment of the invention. With reference to FIG. 1 and FIG. 5, the computer host 110 is connected to the management host 130 through the bridge 138, and the management host 130 is embedded in or coupled to a system-on-chip (SoC) 560 (e.g. through a parallel or serial bus, a network interface such as ethernet or optical fiber, etc.), wherein the system-on-chip 560 includes a central processing unit (CPU) 561, a chipset 563, and a memory 565. In this embodiment, the bridge 138 is provided with an address lookup table 550. When the bridge 138 receives the read request or command transmitted by the computer host 110, the bridge 138 reads the data of the expansion ROM according to the address lookup table 550 and transmits the data of the expansion ROM to the computer host 110.

More specifically, in Step S510, the computer host 110 transmits a read request (e.g. MMIO read command (MMIO read cycle)) to the bridge 138, wherein the read request includes the memory address of the computer host end (e.g. 3G). In Step S520, the bridge 138 transmits a memory read request to the system-on-chip 560 according to data of the address lookup table 550 (e.g. the memory address of the management host end Mem_m and the memory size 1M Bytes in Table 5), wherein the bridge 138 compares the address lookup table and the memory address of the computer host end in the read request. When the comparison shows a match, the bridge 138 transmits the memory read request including the memory address of the management host end to the system-on-chip 560. The chipset 563 obtains, from the memory 565, data corresponding to the memory address of the management host (e.g. memory address Mem_m) recorded in the address lookup table 550 according to the memory read request, wherein the memory address of the management host end is used for storing the data of the expansion ROM. In Step S530, the chipset 563 transmits a memory read response responsive to the memory read request transmitted in Step S520, wherein the memory read response includes the obtained data of the expansion ROM. In Step S590, the bridge 138 transmits a read response to reply the read request transmitted in Step S510, wherein the read response accompanies the data of the expansion ROM. Accordingly, the computer host 110 loads the data of the expansion ROM to complete the boot process.

It should be noted that, before the computer host 110 transmits the read request (e.g. Step S510), the central processing unit 561 already assigns the memory address (e.g. memory address Mem_m) in the memory 565, which corresponds to the memory address of the management host end, to the expansion ROM according to the address lookup table for storing the data of the expansion ROM. Moreover, details of the memory address for storing the data of the expansion ROM, as mentioned in the following embodiment, have been specified above and thus will not be repeated hereinafter.

Figure 6:
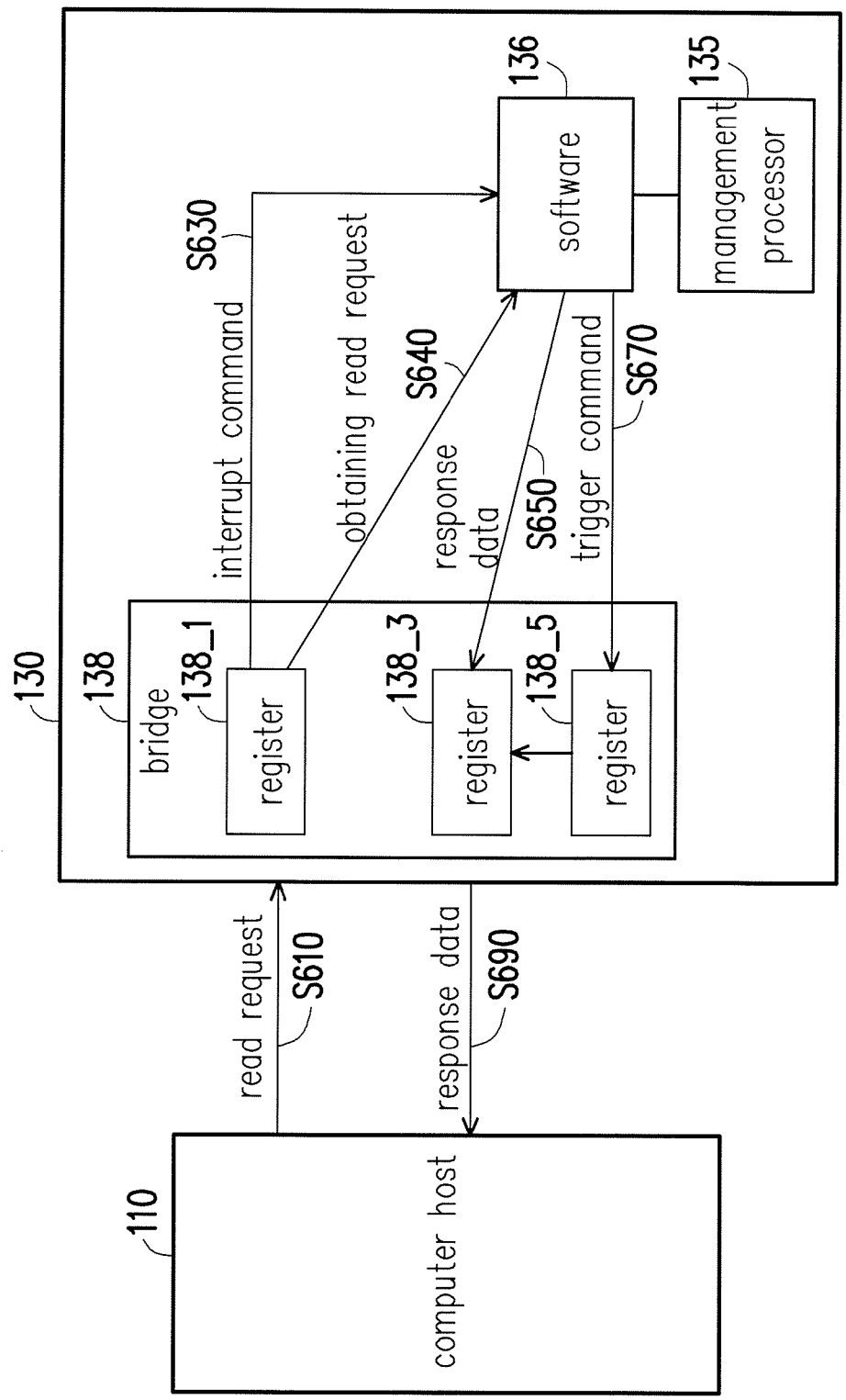
FIG. 6 is a flowchart illustrating the computer host reading data of the expansion ROM according to another embodiment of the invention.

FIG. 6 is a flowchart illustrating the computer host 110 reading the data of the expansion ROM according to another embodiment of the invention. With reference to FIG. 1 and FIG. 6, the bridge 138 receives the read request or command transmitted by the computer host 110 and notifies the management host 130. The management processor 135 uses software simulation to obtain the read command, and the management processor 135 transmits the data of the expansion ROM to the bridge 138 according to the address lookup table and notifies the bridge 138. The bridge 138 then transmits the data of the expansion ROM to the computer host 110.

More specifically, in Step S610, the computer host 110 transmits the read request to the bridge 138. A register 138_1 records the read request and transmits an interrupt command (Step S630). At the same time, the management host 130 executes the operation of the computer host by software (e.g. application program, firmware, system, etc.) simulation. In Step S640, the management processor 135 uses software 136 for simulation to obtain data from the register 138_1 and compares the address lookup table and the data from the register 138_1. In Step S650, when the management processor 135 gets a match (hit) in the comparison by software 136, the management processor 135 responds with the data of the expansion ROM to the register 138_3, wherein the management processor 135 may use software 136 for simulation to obtain the data of the expansion ROM in advance. The management processor 135 uses software 136 for simulation to transmit a trigger command (assert command) to the register 138_5 (e.g. to trigger the register) (Step S670). The register 138_3 then transmits the data of the expansion ROM to the computer host 110 (Step S690).

It should be noted that, in an embodiment, the management processor 135 uses software simulation to obtain the data of the expansion ROM in advance at the memory address (i.e. the memory address, e.g. Mem_m, for storing the data of the expansion ROM) in the memory (not shown) of the management host 130 according to the address lookup table (e.g. the memory address of the computer host end, the memory address of the management host end, and the memory size in Table 2) for providing the data to the computer host 110 later. In another embodiment, the management processor 135 may also compare the read data obtained in Step S640 with the address lookup table (e.g. the memory address of the computer host end in Table 5). If there is a match, the management processor 135 obtains the data of the expansion ROM at the memory address (corresponding to the memory address (M memory) of the management host end, e.g. memory address Mem_m) in the memory of the management host 130 according to the address lookup table (e.g. the memory address of the management host end in Table 5) for providing the data to the register 138_3.

Figure 7A:
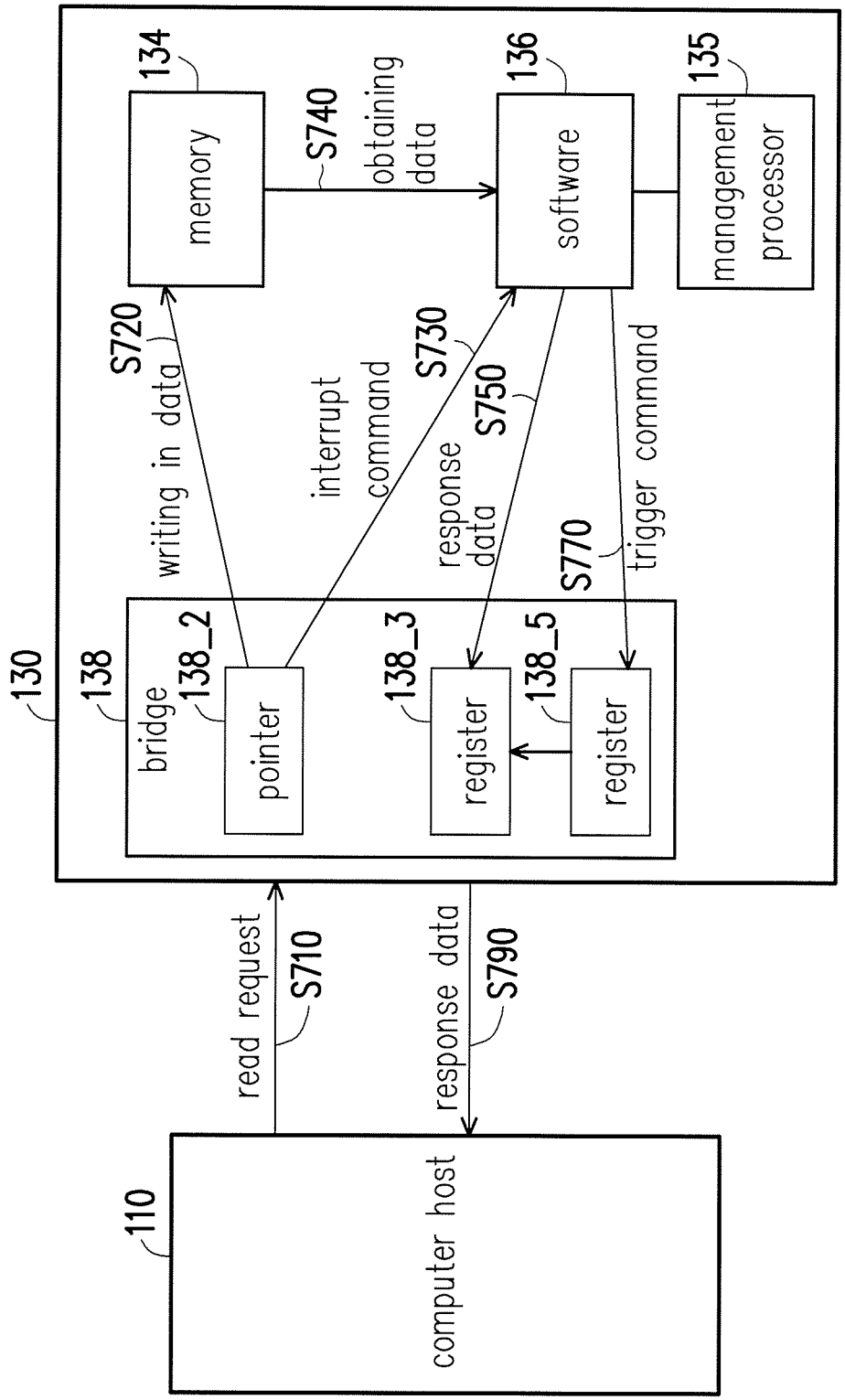
FIG. 7A and FIG. 7B are flowcharts illustrating the computer host reading data of the expansion ROM according to still another embodiment of the invention.
Figure 7B:
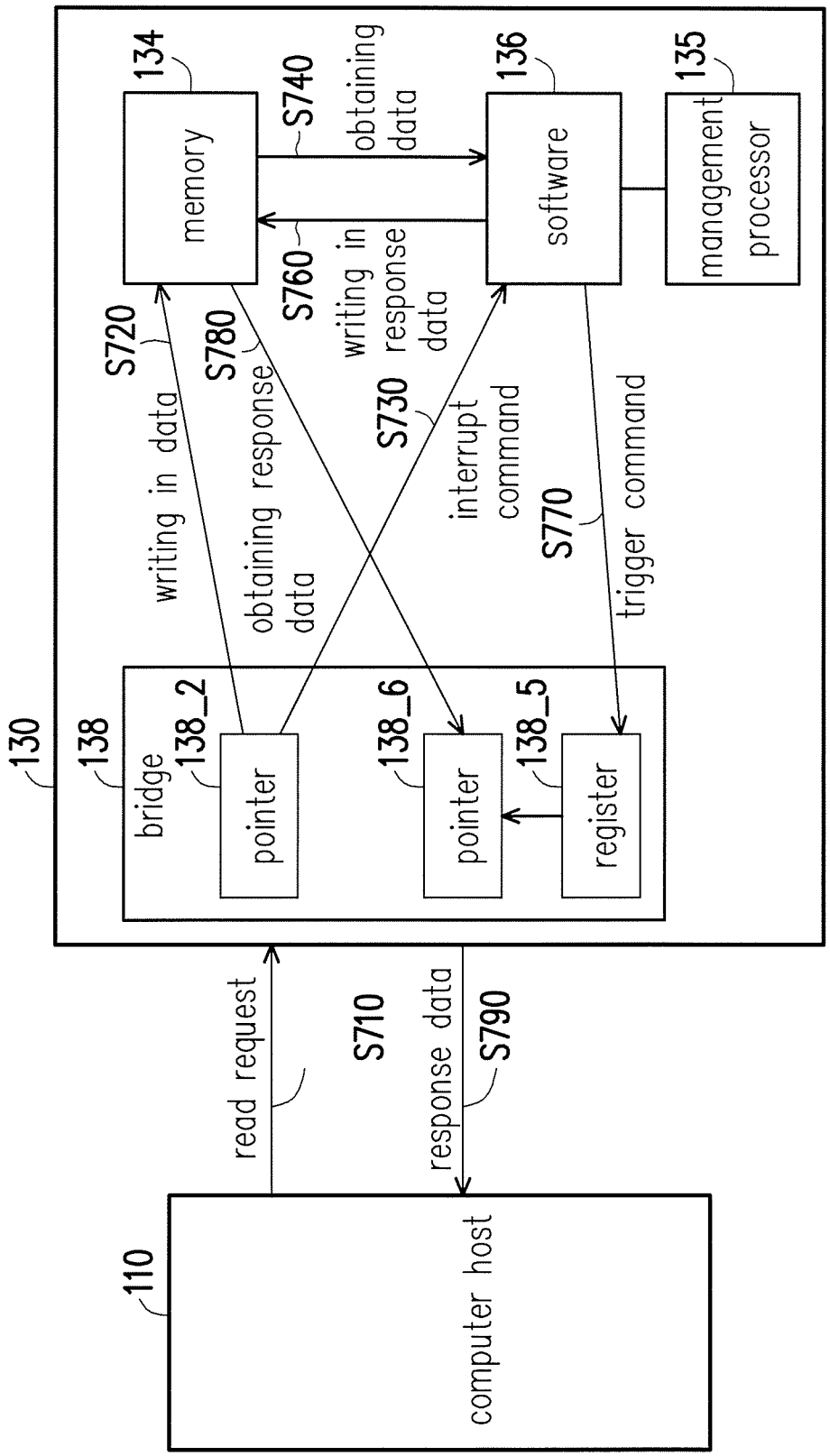

FIG. 7A and FIG. 7B are flowcharts illustrating the computer host 110 reading the data of the expansion ROM according to another embodiment of the invention. With reference to FIG. 1 and FIG. 7A first, the bridge 138 includes a pointer 138_2. The bridge 138 receives the read request or command transmitted by the computer host 110. The pointer 138_2 is used to write the read command and notify the management host 130. The management processor 135 uses software simulation to obtain the data of the expansion ROM, and the management processor 135 transmits the data of the expansion ROM to the bridge 138 and notifies the bridge 138. Further, the bridge 138 transmits the data of the expansion ROM to the computer host 110.

More specifically, in Step S710, the computer host 110 transmits a read request to the bridge 138. The bridge 138 uses the pointer 138_2 to write the received read request to a memory 134 (Step S720) and transmits an interrupt command to the software simulated by the management processor 135 (Step S730). The management processor 135 uses software simulation to obtain the read request from the memory 134 (Step S740) for comparison. When there is a match in the comparison, the management processor 135 responds with the data of the expansion ROM to the register 138_3 (Step S750), wherein the management processor 135 may use software 136 for simulation so as to obtain the data of the expansion ROM in advance. The management processor 135 uses software 136 for simulation so as to transmit a trigger (assert) command to the register 138_5 (e.g. to trigger the register) (Step S770). The register 138_3 then transmits the data of the expansion ROM to the computer host 110 (Step S790). It should be noted that the pointer 138_2 may be preset with the pointed memory address or obtain the pointed memory address through a handshaking process.

Next, with reference to FIG. 1 and FIG. 7B, the bridge 138 of FIG. 7B includes pointers 138_2 and 138_6. The bridge 138 receives the read request or command transmitted by the computer host 110. The pointer 138_2 is used to write the read command and notify the management host 130. The management processor 135 uses software 136 for simulation to obtain a read request, and the management processor 135 generates response data that includes data corresponding to the read request and notifies the bridge. The pointer 138_6 is used to read the response data, and the bridge 138 transmits the response data to the computer host 110.

With reference to FIG. 7A and FIG. 7B, a difference between FIG. 7A and FIG. 7B is that: the bridge 138 further includes the pointer 138_6, and after Step S740, the management processor 135 uses software 136 for simulation to write the response data that includes the data corresponding to the expansion ROM to the memory 134 (Step S760). After transmitting the trigger command in Step S770, the pointer 138_6 is used to obtain the response data that includes the data corresponding to the expansion ROM, as written in Step S760, from the memory 134. Accordingly, the pointer 138_6 is used to provide the data of the expansion ROM to the computer host 110. It should be noted that the pointers 138_2 and 138_6 may be preset with the pointed memory address or obtain the pointed memory address through a handshaking process.

In conclusion of the above, the system and method for managing the expansion ROM and the management host thereof in the invention provide the data in the shadow register block according to the address lookup table by software simulation, so as to respond to the read request and configuration request that the computer host issues for the size of the expansion ROM. Moreover, in the invention, the data of the expansion ROM is provided to the computer host according to the address lookup table. Accordingly, with the invention, the virtual function can support the expansion ROM for the management host to use the resources in the SR-IOV device more flexibly.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An expansion read-only memory (ROM) management system, comprising:
   at least one computer host; and
   a management host connected with the at least one computer host through at least one bridge, wherein the management host comprises at least one virtual function and establishes at least one address lookup table to assign the at least one virtual function and at least one expansion ROM corresponding to the at least one virtual function to the at least one computer host, wherein
   each of the at least one address lookup table comprises a validity status, a computer host number, a virtual function address of a computer host end, a virtual function address of a management host end, a filter status, a filter range, and a corresponding at least one shadow register block, wherein the filter range represents a register address of the at least one expansion ROM, wherein
   the filter status in the at least one address lookup table is preset as "disable", and when the at least one computer host transmits a write command to the management host, the management host sets the filter status in the at least one address lookup table to "enable" according to the write command, transfers the write command to the at least one shadow register block in the at least one address lookup table by software simulation, and performs an operation on the data in the corresponding at least one shadow register block and provides the data in the corresponding at least one shadow register block to the at least one computer host according to an operation result, when the at least one computer host issues a request to obtain a size of the at least one expansion ROM corresponding to the at least one virtual function, the management host provides data in at least one shadow register block corresponding to the at least one expansion ROM to the at least one computer host according to the at least one address lookup table, the at least one computer host assigns at least one memory block of the at least one computer host to the at least one expansion ROM according to the data in the at least one shadow register block, wherein when the at least one computer host issues a request to obtain data of the at least one expansion ROM through the at least one bridge, the management host provides the data of the at least one expansion ROM to the at least one computer host according to the at least one memory block.

2. The expansion ROM management system according to claim 1, wherein the management host performs an AND operation on a write command and a mask bit, and the management host transmits an operation result, as the data in the at least one shadow register block, to the at least one computer host, wherein the operation result represents a virtual address register of the at least one virtual function in the at least one shadow register block.

3. The expansion ROM management system according to claim 2, wherein the management host generates the mask bit based on the size of the at least one expansion ROM.

4. The expansion ROM management system according to claim 1, wherein each of the at least one address lookup table further comprises a memory address of the computer host end, a memory address of the management host end, a memory size, and a memory address translation enable status, wherein the memory size indicates the size of the at least one expansion ROM, wherein the memory address translation enable status is preset as "disable", and when the at least one computer host assigns the at least one memory block to the at least one expansion ROM, the at least one computer host sets a memory enable bit as "enable", and the management host uses data of the at least one memory block as the memory address of the computer host end in the at least one address lookup table; and when the filter status, an enable bit in the data in the corresponding at least one shadow register block, and the memory enable bit are "enable", the management host sets the memory address translation enable status as "enable".

5. The expansion ROM management system according to claim 1, wherein when the at least one computer host determines that the data in the at least one shadow register block is valid, the at least one computer host calculates the size of the at least one expansion ROM according to the data in the at least one shadow register block, and the at least one computer host assigns the at least one memory block to the at least one expansion ROM according to the size of the at least one expansion ROM.

6. The expansion ROM management system according to claim 1, wherein the at least one bridge comprises the at least one address lookup table, and when the at least one computer host transmits a read command, the at least one bridge reads the data of the at least one expansion ROM according to the at least one address lookup table, and the at least one bridge transmits the data of the at least one expansion ROM to the at least one computer host.

7. The expansion ROM management system according to claim 1, wherein when the at least one computer host transmits a read command, the at least one bridge transmits an interrupt command to notify the management host, and the management host reads the read command by software simulation and transmits the data of the at least one expansion ROM to the at least one bridge according to the at least one address lookup table and transmits an interrupt command to notify the at least one bridge, and the at least one bridge transmits the data of the at least one expansion ROM to the at least one computer host.

8. The expansion ROM management system according to claim 1, wherein the at least one bridge comprises a pointer, and when the at least one computer host transmits a read command, the pointer is used to write the read command and transmits an interrupt command to notify the management host, and the management host obtains the data of the at least one expansion ROM by software simulation, transmits the data of the at least one expansion ROM to the at least one bridge, and transmits a trigger command to notify the at least one bridge, and the at least one bridge transmits the data of the at least one expansion ROM to the at least one computer host.

9. The expansion ROM management system according to claim 1, wherein the at least one bridge comprises a first pointer and a second pointer, and when the at least one computer host transmits a read command, the first pointer is used to write the read command and transmits an interrupt command to notify the management host, and the management host obtains the data of the at least one expansion ROM by software simulation and generates response data comprising data corresponding to the at least one expansion ROM, and transmits a trigger command to notify the at least one bridge, and the second pointer is used to read the response data and the at least one bridge transmits the response data to the at least one computer host.

10. An expansion read-only memory (ROM) management method, comprising:
establishing at least one address lookup table to assign at least one virtual function and at least one expansion ROM corresponding to the at least one virtual function to at least one computer host;
providing data in at least one shadow register block corresponding to the at least one expansion ROM to the at least one computer host according to the at least one address lookup table when the at least one computer host issues a request to obtain a size of the at least one expansion ROM corresponding to the at least one virtual function;
the at least one computer host assigning at least one memory block of the at least one computer host to the at least one expansion ROM according to the data in the at least one shadow register block; and
providing data of the at least one expansion ROM to the at least one computer host according to the at least one memory block when the at least one computer host issues a request to obtain the data of the at least one expansion ROM through at least one bridge, wherein
each of the at least one address lookup table comprises a validity status, a computer host number, a virtual function address of a computer host end, a virtual function address of a management host end, a filter status, a filter range, and a corresponding at least one shadow register block, wherein the filter status in the at least one address lookup table is preset as "disable" and the filter range represents a register address of the at least one expansion ROM, and the step of providing the data in the at least one shadow register block comprises:

setting the filter status in the at least one address lookup table to "enable" according to a write command when the write command is received from the at least one computer host;

transferring the write command to the at least one shadow register block in the at least one address lookup table by software simulation; and performing an operation on the data in the corresponding at least one shadow register block and providing the data in the corresponding at least one shadow register block to the at least one computer host according to an operation result.

11. The expansion ROM management method according to claim 10, wherein the step of providing the data in the at least one shadow register block comprises:

performing an AND operation on a write command and a mask bit; and transmitting an operation result, as the data in the at least one shadow register block, to the at least one computer host, wherein the operation result represents a virtual address register of the at least one virtual function in the at least one shadow register block.

12. The expansion ROM management method according to claim 11, wherein before the step of performing the AND operation on the write command and the mask bit, the expansion ROM management method further comprises:

generating the mask bit based on the size of the at least one expansion ROM.

13. The expansion ROM management method according to claim 10, wherein each of the at least one address lookup table further comprises a memory address of the computer host end, a memory address of the management host end, a memory size, and a memory address translation enable status, wherein the memory address translation enable status is preset as "disable" and the memory size indicates the size of the at least one expansion ROM, and the step of the at least one computer host assigning the at least one memory block of the at least one computer host to the at least one expansion ROM according to the data in the at least one shadow register block comprises:

the at least one computer host setting a memory enable bit as "enable" when the at least one computer host assigns the at least one memory block to the at least one expansion ROM;

using data of the at least one memory block as the memory address of the computer host end in the at least one address lookup table; and setting the memory address translation enable status as "enable" when the filter status, an enable bit in the data in the corresponding at least one shadow register block, and the memory enable bit are "enable".

14. The expansion ROM management method according to claim 10, wherein the step of the at least one computer host assigning the at least one memory block of the at least one computer host to the at least one expansion ROM according to the data in the at least one shadow register block comprises:

the at least one computer host calculating the size of the at least one expansion ROM according to the data in the at least one shadow register block when the at least one computer host determines that the data in the at least one shadow register block is valid; and the at least one computer host assigning the at least one memory block to the at least one expansion ROM according to the size of the at least one expansion ROM.

15. The expansion ROM management method according to claim 10, wherein the at least one bridge comprises the at least one address lookup table, and the step of providing the data of the at least one expansion ROM to the at least one computer host comprises:

receiving a read command transmitted by the at least one computer host;

reading the data of the at least one expansion ROM according to the at least one address lookup table; and transmitting the data of the at least one expansion ROM to the at least one computer host through the at least one bridge.

16. The expansion ROM management method according to claim 10, wherein the step of providing the data of the at least one expansion ROM to the at least one computer host comprises:

receiving a read command transmitted by the at least one computer host;

receiving a trigger command transmitted by the at least one bridge;

reading the read command by software simulation, and transmitting the data of the at least one expansion ROM to the at least one bridge according to the at least one address lookup table and transmitting a trigger command to the at least one bridge; and transmitting the data of the at least one expansion ROM to the at least one computer host through the at least one bridge.

17. The expansion ROM management method according to claim 10, wherein the at least one bridge comprises a pointer, and the step of providing the data of the at least one expansion ROM to the at least one computer host comprises:

receiving a read command transmitted by the at least one computer host;

writing in the read command and transmitting an interrupt command using the pointer;

obtaining the data of the at least one expansion ROM by software simulation;

transmitting the data of the at least one expansion ROM to the at least one bridge and transmitting a trigger command to notify the at least one bridge; and transmitting the data of the at least one expansion ROM to the at least one computer host through the at least one bridge.

18. The expansion ROM management method according to claim 10, wherein the at least one bridge comprises a first pointer and a second pointer, and the step of providing the data of the at least one expansion ROM to the at least one computer host comprises:

receiving a read command transmitted by the at least one computer host;

writing in the read command and transmitting an interrupt command using the first pointer;

obtaining the data of the at least one expansion ROM by software simulation;

generating response data comprising data corresponding to the at least one expansion ROM and transmitting a trigger command to notify the at least one bridge;

reading the response data using the second pointer; and transmitting the response data to the at least one computer host through the at least one bridge.

19. A management host, comprising:
a switch comprising at least one bridge, wherein the at least one bridge is respectively coupled to at least one corresponding computer host;
an I/O virtualization device coupled to the switch and having at least one virtual function; and
a management processor coupled to the switch and establishing at least one address lookup table to assign the at least one virtual function and at least one expansion ROM corresponding to the at least one virtual function to the at least one computer host, wherein
each of the at least one address lookup table comprises a validity status, a computer host number, a virtual function address of a computer host end, a virtual function address of a management host end, a filter status, a filter range, and a corresponding at least one shadow register block, wherein the filter range represents a register address of the at least one expansion ROM, wherein
the filter status in the at least one address lookup table is preset as "disable", and when the at least one computer host transmits a write command to the management host, the management processor sets the filter status in the at least one address lookup table to "enable" according to the write command, writes the write command only to the corresponding at least one shadow register block in the at least one address lookup table by software simulation, and performs an operation on the data in the corresponding at least one shadow register block and provides the data in the corresponding at least one shadow register block to the at least one computer host through the at least one bridge according to an operation result,
when the at least one computer host issues a request to obtain a size of the at least one expansion ROM corresponding to the at least one virtual function, the management processor provides data in at least one shadow register block corresponding to the at least one expansion ROM to the at least one computer host according to the at least one address lookup table,
the at least one computer host assigns at least one memory block of the at least one computer host to the at least one expansion ROM according to the data in the at least one shadow register block, wherein
when the at least one computer host issues a request to obtain data of the at least one expansion ROM through the at least one bridge, the management processor provides the data of the at least one expansion ROM to the at least one computer host according to the at least one memory block.

20. The management host according to claim 19, wherein the management processor performs an AND operation on a write command and a mask bit, and the management processor transmits an operation result, as the data in the at least one shadow register block, to the at least one computer host, wherein the operation result represents a virtual address register of the at least one virtual function in the at least one shadow register block.

21. The management host according to claim 20, wherein the management processor generates the mask bit based on the size of the at least one expansion ROM.

22. The management host according to claim 19, wherein each of the at least one address lookup table further comprises a memory address of the computer host end, a memory address of the management host end, a memory size, and a memory address translation enable status, wherein the memory size indicates the size of the at least one expansion ROM, wherein the memory address translation enable status is preset as "disable", and when the at least one computer host assigns the at least one memory block to the at least one expansion ROM, the at least one computer host sets a memory enable bit as "enable" and the management processor uses data of the at least one memory block as the memory address of the computer host end in the at least one address lookup table, and when the filter status, an enable bit in the data in the at least one shadow register block, and the memory enable bit are "enable", the management processor sets the memory address translation enable status as "enable".

23. The management host according to claim 19, wherein when the at least one computer host determines that the data in the at least one shadow register block is valid, the at least one computer host calculates the size of the at least one expansion ROM according to the data in the at least one shadow register block, and the at least one computer host assigns the at least one memory block to the at least one expansion ROM according to the size of the at least one expansion ROM.

24. The management host according to claim 19, wherein the at least one bridge of the switch comprises the at least one address lookup table, and when the at least one computer host transmits a read command, the at least one bridge reads the data of the at least one expansion ROM according to the at least one address lookup table, and the at least one bridge transmits the data of the at least one expansion ROM to the at least one computer host.

25. The management host according to claim 19, wherein when the at least one computer host transmits a read command, the at least one bridge of the switch transmits an interrupt command to notify the management host, and the management processor reads the read command by software simulation and transmits the data of the at least one expansion ROM to the at least one bridge according to the at least one address lookup table and transmits a trigger command to notify the at least one bridge, and the at least one bridge transmits the data of the at least one expansion ROM to the at least one computer host.

26. The management host according to claim 19, wherein the at least one bridge of the switch comprises a pointer, and when the at least one computer host transmits a read command, the pointer is used to write the read command and transmits an interrupt command to notify the management host, and the management processor obtains the data of the at least one expansion ROM by software simulation, transmits the data of the at least one expansion ROM to the at least one bridge, and transmits a trigger command to notify the at least one bridge, and the at least one bridge transmits the data of the at least one expansion ROM to the at least one computer host.

27. The management host according to claim 19, wherein the at least one bridge of the switch comprises a first pointer and a second pointer, and when the at least one computer host transmits a read command, the first pointer is used to write the read command and transmits an interrupt command to notify the management host, and the management processor obtains the data of the at least one expansion ROM by software simulation, generates response data comprising data corresponding to the at least one expansion ROM, and notifies transmit an interrupt command to notify the at least one bridge, and the second pointer is used to read the response data and the at least one bridge transmits the response data to the at least one computer host.

* * * * *